United States Patent [19]

Severini et al.

[11] 3,726,946
[45] Apr. 10, 1973

[54] POLYVINYLCHLORIDE MODIFIED BY A GRAFT COPOLYMER OF VINYL CHLORIDE ONTO POLYPENTENAMER

[75] Inventors: Febo Severini; Alberto Valvassori, both of Milan; Alberto Pagliari, Saronno, all of Italy

[73] Assignee: Montecatini Edison S.p.A., Milan, Italy

[22] Filed: Feb. 23, 1971

[21] Appl. No.: 118,097

[30] Foreign Application Priority Data

Feb. 24, 1970    Italy..................................21025 A/70

[52] U.S. Cl. ............260/876 R, 260/23 R, 260/23 H, 260/93.1, 260/45.95, 260/875, 260/884
[51] Int. Cl. ..............................................C08f 39/00
[58] Field of Search ...............260/876 R, 887, 897 C

[56] References Cited

UNITED STATES PATENTS

| | | | |
|---|---|---|---|
| 3,622,653 | 11/1971 | Schuster | 260/881 |
| 3,281,345 | 10/1966 | Kuhne | 260/876 R |
| 3,523,145 | 8/1970 | Manaresi et al. | 260/876 R |
| 3,358,054 | 12/1967 | Hardt et al. | 260/876 R |
| 3,334,156 | 8/1967 | Calentine et al. | 260/876 R |
| 3,444,268 | 5/1969 | Beer | 260/876 R |

*Primary Examiner*—Samuel H. Blech
*Assistant Examiner*—John Seibert
*Attorney*—P. Q. Peake et al.

[57]    ABSTRACT

There are disclosed new, high-impact resistant compositions based on polyvinylchloride and comprising graft copolymers of vinyl monomers and certain rubbery polyalkenamers having a narrow molecular weight distribution. Unexpectedly, the graft copolymers function to improve the mechanical properties, more particularly the impact resistance, of the compositions, as compared to polyvinylchloride, per se.

That polyvinylchloride tends to be brittle and to have relatively low impact resistance is well known. In the past, it has been attempted to overcome the brittleness of polyvinylchloride, and its relatively low impact resistance by incorporating various plasticizers with it. A problem has been the tendency of the plasticizers to "-bleed," a result of a basic incompatibility of the polyvinylchloride and the plasticizers available.

4 Claims, No Drawings

POLYVINYLCHLORIDE MODIFIED BY A GRAFT COPOLYMER OF VINYL CHLORIDE ONTO POLYPENTENAMER

THE PRESENT INVENTION

This invention provides new compositions based on polyvinylchloride and comprising graft copolymers of vinyl monomers, such as vinyl acetate or vinyl chloride, with particular rubbery polyalkenamers, which compositions are not brittle like polyvinylchloride and have an unexpectedly high impact resistance.

The polyalkenamers are obtained from cyclo-olefins, by ring-opening polymerization thereof.

Processes for preparing the polyalkenamers are disclosed in, for instance, U.S. Pat. Nos. 3,458,489; 3,549,607; 3,459,725; 3,449,310 and 3,476,728.

The polyalkenamers used in practicing this invention are made up of units of the formula $$-(CH_2)_n - CH = CH -$$

consist essentially of linear and stereoregular macromolecules having a high percentage of either the cis- or trans- form, are rubbery or rubber-like, and are further characterized in having a very narrow molecular weight distribution.

The graft copolymers can be prepared by known methods. As is known, graft copolymers may have a more or less high content of a homopolymer of the monomer used for the graft, depending on the conditions used in preparing the graft copolymer.

The graft copolymers used in practicing this invention are free of homopolymers and have a high content of the rubbery polyalkenamer.

The side chains grafted onto the polyalkenamer, which are preferably polyvinylchloride or polyvinylacetate side chains, and, therefore, similar to the macromolecules (polyvinylchloride) which form the matrix, insure the stability of the dispersion of the rubber (polyalkenamer) through the polyvinylchloride which is reinforced by the graft copolymer. This is a result which cannot be obtained by mixing the unmodified rubber (polyalkenamer, per se) with the polyvinylchloride, since the polyalkenamers are similar to the known plasticizers in being incompatible with polyvinylchloride. The rubbery polyalkenamers per se, when mixed with polyvinylchloride, separate from the mixture and migrate to the surface of manufactured articles formed of the mixture.

The graft reaction may be carried out according to known processes. Preferably, if the reactivity of the monomer and the reaction conditions favor it, the graft reaction is effected by chain transfer. The grafting reaction may be carried out in bulk, in emulsion, in solution or in suspension, or by mixed methods such as bulk-suspension, solution-precipitation, etc. Variations of the mentioned techniques may be used.

The graft reaction is carried out in the presence of initiators.

Suitable initiators include organic peroxides, such as, for instance, acetyl peroxide, lauryl peroxide, benzoyl peroxide, and di-tert. butyl peroxide. The initiator may also be a thermally unstable inorganic compound such as, for instance, ammonium persulphate, or a thermally unstable azoic derivative such as azo-bis-isobutyrronitrile. Redox systems consisting of hydroperoxides and a reducing agent may also be employed as the initiator.

The amount of initiator used, calculated with reference to the total mass of reactants, varies between 0.1 and 10 percent by weight. Preferably, it is comprised between 0.2 and 5 percent by weight.

The temperature for the graft copolymerization depends on the initiator used and is in the range 0°C to 100°C. It is preferably carried out in the presence of a suitable amount of a molecular weight regulator which may be, for example, a mercaptan or other molecular weight regulating agent.

When the graft copolymerization is carried out in solution, the solvent may be an aliphatic hydrocarbon such as butane or n-pentane, a cycloaliphatic hydrocarbon such as cyclohexane, or an aromatic hydrocarbon such as benzene or toluene. Mixed solvents may be used.

The graft copolymerization of the vinyl monomer and polyalkenamer in aqueous suspension may be carried out by suspending a solution of the polyalkenamer in the vinyl monomer in water, or by polymerizing the vinyl monomer in the presence of the rubber (polyalkenamer) suspended in water in a finely divided form. In general, small amounts of suspending agents are used, on the order of 0.2 to 1.0 percent by weight, based on the weight of the reaction mass. The suspending agent may be a hydrosoluble organic polymer, such as polyvinylalcohol obtained by partial or total hydrolysis of polyvinylacetate, methylcellulose, carboxymethyl cellulose, and so on.

The graft copolymerization in emulsion may be carried out directly in the emulsion obtained by dispersing in water, in the presence of surface-active agent, the pseudo-solution obtained by mixing the polyalkenamer with a suitable solvent, or it may be effected in the aqueous emulsion remaining after distilling off the solvent, under reduced pressure, from the starting dispersion.

Anionic surfactants may be used in the emulsion process, such as, for instance, sodium dodecylbenzene-sulphonate, or sodium oleate. Non-ionic surfactants are also useful, including, for instance, the products of reaction between alkylphenol and ethylene oxide. Also useful are mixtures of non-ionic and anionic surfactants, as well as sulphonated derivatives of the products of reaction between alkylphenols and ethylene oxide.

The graft copolymers of vinyl monomers and polyalkenamers comprised in the compositions of this invention are reinforcing agents for the polyvinylchloride.

In one preferred embodiment, the reinforcing agent is a graft copolymer of polypentenamer having a prevailingly (over 50 percent trans-structure with vinyl chloride and characterized by a chlorine content of from 20% to 40%.

Analogous results are obtained using as reinforcing agent a graft copolymer of polypentenamer having a prevailingly (over 50 percent) cis-structure with vinyl chloride and characterized by a chlorine content of from 20 to 40 percent.

The compositions, in addition to possessing increased impact resistance, as compared to polyvinylchloride, are also highly transparent, and have a light transmission value comprised between 40% and 80%.

The following examples are given to illustrate the invention and are not intended to be limiting.

EXAMPLE 1

*a.* Preparation of the polyalkenamer

Cyclopentene, through which air at room temperature had been bubbled for an hour and a half, was polymerized during one hour at a temperature of −30° C, in the presence of tungsten hexachloride and aluminum-diethyl monochloride in a molar ratio of 1 : 5. The molar ratio tungsten hexachloride/cyclopentene amounted to 1 : 120.

The polymerization was interrupted by the addition of methanol and the reaction mixture was then introduced into methanol containing hydrochloric acid. The polymer thus obtained was dissolved in benzene containing phenylbetanaphthylamine, the solution was filtered and then poured into the methanol. The coagulated polymer was suspended in methanol containing 0.1 percent of betanaphthylamine, the suspension was filtered and the polymer was finally dried under a reduced pressure and at room temperature.

The polypentenamer obtained consisted of macromolecules having predominantly a trans structure and characterized by an intrinsic viscosity, determined in toluene at 30°C, of 1.7 dl/g.

*b.* Preparation of the aqueous emulsion of polyalkenamers 100 g of the polypentenamer obtained in (a) were mixed with 900 g of toluene and maintained under stirring at room temperature until a homogeneous pasty mass was obtained.

To the pseudo-solution thus obtained there were added 12 g of a surfactant known by the commerical name of Fenopon Co. 436 (containing 50 percent by weight of the ammonium salt of the sulphate of an alkylphenoxy-polyethylenoxy ethanol) and, slowly, keeping the mass under stirring, 1000 g of de-ionized water. The mixture thus obtained was then subjected for 20 minutes to the action of a mechanical emulsifier and the latex thus prepared was then freed of the toluene by distillation under reduced pressure of a toluene/water mixture.

The latex thus obtained had a dry residue of 9.5% which corresponds to a content in polypentanamer of 8.9%.

*c.* Graft reaction of the polyalkenamer

Into a 1 liter glass autoclave fitted with an anchor stirrer, were introduced:

225 g of the latex prepared under (b),
0.22 g of sodium hexametaphosphate,
0.15 g of cumene hydroperoxide at 72%,
0.08 g of sodium formaldehyde-sulphoxylate, and then, after removal of the air by washing with nitrogen, 35 g of monomeric vinylchloride. The temperature of the thermostatically stabilized bath in which the reactor is immersed, was brought up to 38°C and the reaction mixture was kept under stirring for 8 hours, after which period the residual gas was discharged while the obtained emulsion was coagulated in methanol.

After drying of the coagulated product, there were obtained 40 g of a raw product containing 50 percent of rubber polypentenamer and 50 percent of polyvinyl chloride grafted onto the rubber, as can be seen from the fact that there was pracitcally no extract when the product was treated with an excess of cyclohexanone at 30°C.

The raw reaction product was then mixed with a commerical polyvinyl chloride with a Fikentscher constant of 60 to obtain a composition containing 9 percent by weight of the polyalkenamer. The mixture thus obtained, after stabilization by the addition of 2 percent barium stearate and cadmium powder coprecipitate as a stabilizer, and of 0.1 percent of an antioxidant of the phenolic type and known by the trade mark of "IRGANOX" 1076, for reducing the degrading effects on processing of the elastomeric phase, was homogenized in a roller mixer at the temperature of 185°C, and the products thus obtained were subsequently compression molded at a temperature of 180°C. The specimens required for the determination of the mechanical properties of the material were obtained from the compression-molded plates. In this example, and in the following ones, the mechanical characteristics were determined according to the following ASTM standards:

| | |
|---|---|
| Izod impact (notched) | ASTM D 256-56 |
| Rockwell hardness | ASTM D 785-62 |

The mechanical properties of the mixture obtained according to this example were as follows:

| | |
|---|---|
| Izod impact (notched) at 23°C = | 18 kg. cm/cm |
| Rockwell hardness (scale L) = | 62 |

EXAMPLE 2

Into a 2 liter autoclave provided with a mechanical stirrer and an oil-circulation heating circuit, were introduced:

140 g of deionized and boiled water,
50 g of a 5 percent solution of polyvinyl alcohol (Elvano 50-42)
22 g of the polypentenamer obtained under (*a*) of Example 1, in small pieces; and after washing with nitrogen,
200 g of monomeric vinyl chloride.

This mixture was allowed to stand at rest, at room temperature, for 20 hours, in order to promote the dissolving process and the swelling of the polypentenamer in the monomer. Thereafter, stirring was started, the reaction mass was heated up to 65°C, and maintained at that temperature for 2 hours, after which a suspension of 0.76 g of benzoyl peroxide in 350 g of deionized and boiled water, was added. The reaction mass, maintained at 65°C, was kept under stirring for 12 hours, after which period it was cooled down and discharged.

After centrifuging and drying, 35 g of material were recovered containing 38.2 percent of bound polyvinyl chloride, as can be deduced from the absence of products extractable with cyclohexanone.

The raw product thus obtained was diluted with a commercial polyvinyl chloride having a Fikentschner constant of 60, and was then stabilized and molded as indicated in Example 1 (*c*).

The material thus obtained was transparent and characterized by the following properties:

| | |
|---|---|
| Izod impact at 23°C: | 15 Kg.cm/cm |
| Rockwell hardness scale L: | 61 |

The compositions of the invention may also include other vinyl polymers, in addition to polyvinylchloride, for example polystyrene.

The compositions of the invention can be used for any of the purposes for which polyvinylchloride is used.

As will be apparent, changes and modifications in details may be made in practicing the invention, without departing from its spirit. Therefore, we intend to include in the scope of the appended claims all such changes and modifications as will be obvious to those skilled in the art from the description and working examples given herein.

What is claimed is:

1. Compositions the essential ingredients of which are polyvinyl chloride and a graft copolymer of vinyl chloride and a rubbery polypentenamer in which the polypentenamer content is from about 50 to about 62 percent by weight, the amount of the polypentenamer in the composition being from 9 to 20 percent by weight.

2. Compositions according to claim 1, the essential ingredients of which are polyvinyl chloride and graft copolymers of vinyl chloride and polypentenamers having a chloride content of from 20 to 40 percent by weight.

3. Compositions according to claim 1, characterized in that the essential ingredients thereof are polyvinyl chloride and graft copolymers of vinyl chloride and polypentenamers having a prevailingly trans-structure, said graft copolymers containing from 20 to 40 percent by weight of chlorine.

4. Manufactured articles of the compositions according to claim 1.

* * * * *

UNITED STATES PATENT OFFICE
CERTIFICATE OF CORRECTION

Patent No. 3,726,946　　　　　Dated April 10, 1973

Inventor(s) Febo Severini et al

It is certified that error appears in the above-identified patent and that said Letters Patent are hereby corrected as shown below:

Col. 3, line 63 (Example 1) "pracitcally" should be - - -practically- - -.

Col. 6, line 4 (claim 2) "chloride" should read - - -chlorine- - -.

Signed and sealed this 18th day of June 1974.

(SEAL)
Attest:

EDWARD M. FLETCHER, JR.　　　　　　C. MARSHALL DANN
Attesting Officer　　　　　　　　　　Commissioner of Patents